(12) United States Patent
Kim

(10) Patent No.: US 11,904,853 B2
(45) Date of Patent: Feb. 20, 2024

(54) APPARATUS FOR PREVENTING VEHICLE COLLISION AND METHOD THEREOF

(71) Applicant: LG ELECTRONICS INC., Seoul (KR)

(72) Inventor: Hyunmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 994 days.

(21) Appl. No.: 16/811,589

(22) Filed: Mar. 6, 2020

(65) Prior Publication Data

US 2021/0139025 A1    May 13, 2021

(30) Foreign Application Priority Data

Nov. 12, 2019    (KR) .................. 10-2019-0144352

(51) Int. Cl.
| | |
|---|---|
| *B60W 30/095* | (2012.01) |
| *B60W 30/09* | (2012.01) |
| *B60R 11/04* | (2006.01) |
| *G06N 3/08* | (2023.01) |
| *H04W 4/46* | (2018.01) |
| *B60W 30/16* | (2020.01) |
| *B60Q 9/00* | (2006.01) |
| *G08G 1/16* | (2006.01) |
| *G06V 20/58* | (2022.01) |

(52) U.S. Cl.
CPC ......... *B60W 30/0956* (2013.01); *B60Q 9/008* (2013.01); *B60R 11/04* (2013.01); *B60W 30/09* (2013.01); *B60W 30/162* (2013.01); *G06N 3/08* (2013.01); *G06V 20/58* (2022.01); *G08G 1/163* (2013.01); *H04W 4/46* (2018.02); *B60R 2300/301* (2013.01)

(58) Field of Classification Search
CPC ... B60Q 9/008; B60R 11/04; B60R 2300/301; B60W 30/09; B60W 30/0956; B60W 30/162; G06N 3/08; G06V 20/58; G08G 1/163

See application file for complete search history.

(56) References Cited

U.S. PATENT DOCUMENTS

2016/0362050 A1*  12/2016  Lee ..................... B60R 1/00

\* cited by examiner

*Primary Examiner* — Charles J Han
(74) *Attorney, Agent, or Firm* — Birch, Stewart, Kolasch & Birch, LLP

(57) ABSTRACT

An electronic apparatus provided in a first vehicle for determining a collision possibility can include an input unit configured to receive surrounding information of the first vehicle; a communication unit configured to communicate with at least one surrounding vehicle around the first vehicle; and at least one processor configured to operate in conjunction with the input unit and the communication unit, in which the at least one processor is further configured to receive a first image via the input unit, receive at least one second image from the at least one surrounding vehicle via the communication unit, and determine a collision possibility of the first vehicle based on the first image and the at least one second image.

19 Claims, 10 Drawing Sheets

APPARATUS FOR PREVENTING VEHICLE COLLISION AND METHOD THEREOF

CROSS REFERENCE TO RELATED APPLICATION

The present application claims priority benefit to Korean Patent Application No. 10-2019-0144352, filed Nov. 12, 2019 in the Republic of Korea, the entire contents of which are incorporated herein for all purposes by this reference.

BACKGROUND

Recently, interest in self-driving vehicles has increased. The world's leading automakers and tech companies are researching and developing self-driving vehicles.

Self-driving vehicles are vehicles that drive on their own without a user's manipulation. In addition, self-driving vehicles may be vehicles that automatically detect a situation of surrounding vehicles by using a camera and a sensor attached to the vehicle, and drive on their own.

Accordingly, in self-driving vehicles, cameras or sensors that function as the eyes or ears of the driver should not operate erroneously. When surrounding vehicles or a road situation is not detected correctly due to superannuated sensors, an accident can occur.

SUMMARY

Failures in a sensor or camera of a vehicle may cause a self-driving vehicle to misjudge a situation, and thus lead to an accident. Accordingly, when a possibility of failure in the sensor or camera of the vehicle is present, a method and procedure of detecting the failure, or a method and procedure for enabling self-driving for the failure is desired.

Various embodiments are related to an apparatus and method of preventing a vehicle collision.

Various embodiments of the present disclosure provide a method of determining a collision possibility based on image data of the vehicle itself, and also determining a collision possibility based on image data of a surrounding vehicle.

Various embodiments of the present disclosure provide an electronic apparatus for determining a collision possibility based on image data of the vehicle itself, and also determining a collision possibility based on image data of a surrounding vehicle which includes a preceding vehicle.

Various embodiments of the present disclosure provide a method and electronic apparatus informing a surrounding vehicle of accident risk and an avoidance operational method when it is determined that a collision in the corresponding surrounding vehicle is expected based on image data captured by the vehicle itself.

The technical problems solved by the present disclosure are not limited to the above technical problems and other technical problems which are not described herein will become apparent to those skilled in the art from the following description.

According to various embodiments, an electronic apparatus provided in a first vehicle for determining a collision possibility comprises an input unit configured to receive surrounding information of the first vehicle, a communication unit configured to communicate with at least one surrounding vehicle around the first vehicle and at least one processor configured to operate in conjunction with the input unit and the communication unit. The at least one processor is further configured to receive a first image via the input unit, receive at least one second image from the at least one surrounding vehicle via the communication unit, and determine a collision possibility of the first vehicle based on the first image and the at least one second image.

According to various embodiments, a first vehicle comprises at least one sensor configured to obtain surrounding information of the first vehicle; the above electronic apparatus for determining a collision possibility of the first vehicle and a brake driving unit configured to control the first vehicle.

According to various embodiments, a method of determining a collision possibility by an electronic apparatus provided in a first vehicle comprises receiving a first image captured by at least one sensor in the first vehicle, receiving at least one second image from at least one surrounding vehicle around the first vehicle via a communication unit in the first vehicle and determining a collision possibility of the first vehicle based on the first image and the at least one second image.

According to various embodiments, a collision possibility can be detected based on image data obtained from the vehicle itself and image data received from a surrounding vehicle, and thus accidents can be prevented even when a failure occurs in a sensor or camera.

According to various embodiments, each of a plurality of vehicles can detect a collision possibility of the vehicle itself and other vehicles based on an image captured by the vehicle itself, and informs of the same, and thus accidents can be significantly reduced.

Effects that may be obtained from the present disclosure will not be limited to only the above described effects. In addition, other effects which are not described herein will become apparent to those skilled in the art from the following description.

BRIEF DESCRIPTION OF THE DRAWINGS

FIG. 1 is a view showing an AI system according to various embodiments;

FIG. 2 is a view showing an AI server including artificial intelligence technologies according to various embodiments;

FIG. 3 is a view showing an electronic apparatus determining a possibility of a vehicle collision according to various embodiments;

FIG. 4 is a view of a flowchart showing functions for performing a method of determining a possibility of a vehicle collision proposed in the present disclosure by at least one of a processor and a learning processor of an electronic apparatus according to various embodiments;

FIG. 5 is a view showing an example of determining a collision possibility between a preceding first vehicle and a second vehicle;

FIG. 6 is a view showing an example of determining a collision possibility between a first vehicle and a preceding second vehicle by an operation in conjunction with a surrounding vehicle;

FIG. 7 is a view showing an example of determining, by a surrounding vehicle, a collision possibility between a first vehicle and a second vehicle at an intersection;

FIG. 8 is a view showing another example of determining, by a surrounding vehicle, a collision possibility between a first vehicle and a second vehicle at an intersection;

FIG. 9 is a view showing an example of determining, by a surrounding vehicle, a collision possibility between a first vehicle and a second vehicle;

Figure 10:
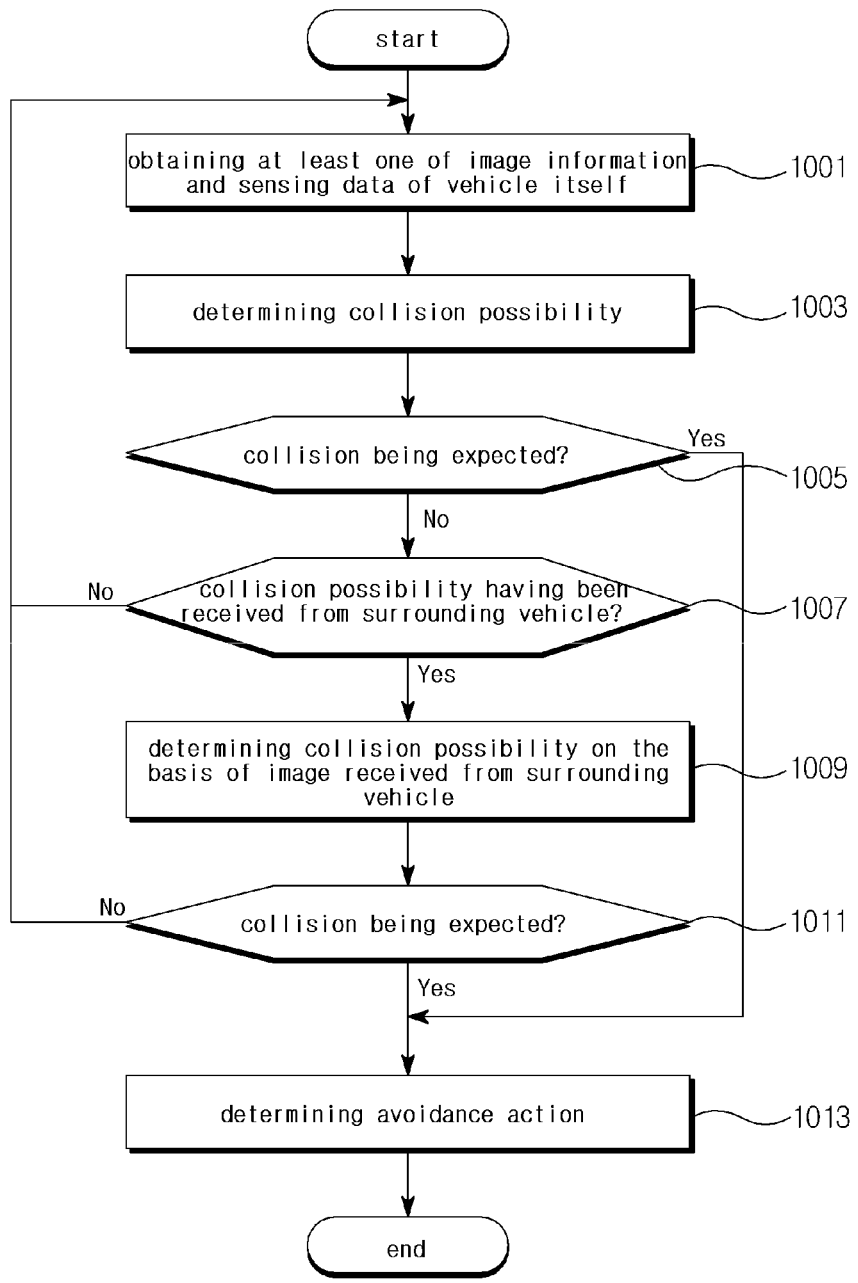
Figure 11:
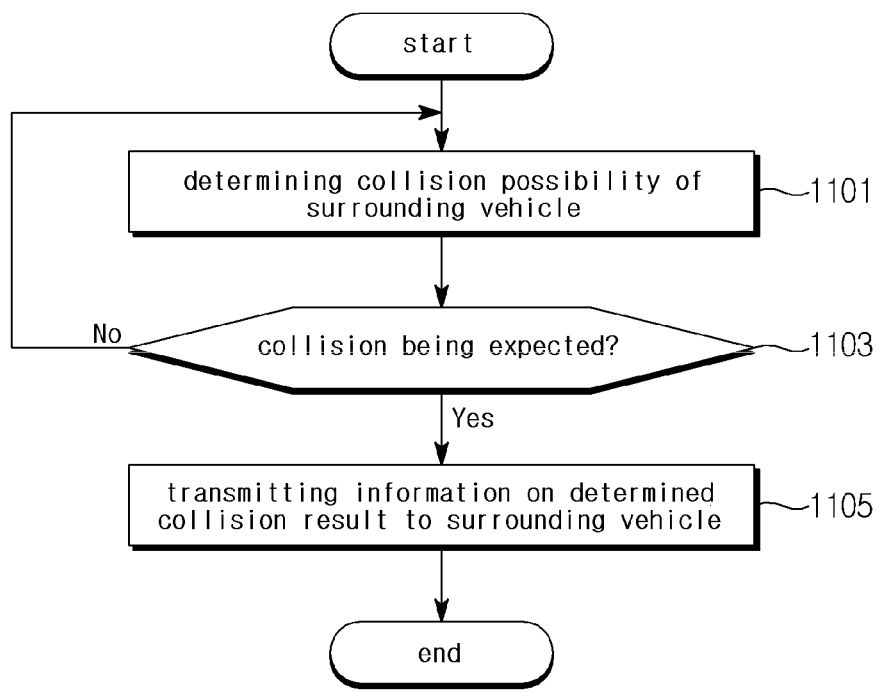

FIG. 10 is a view of a flowchart determining, by the electronic apparatus 100, a collision possibility of a vehicle itself and determining an avoidance action according to various embodiments; and FIG. 11 is a view of a flowchart determining, by the electronic apparatus 100, a collision possibility of a surrounding vehicle according to various embodiments.

In connection with the description of the drawings, the same or similar reference numerals may be used for the same or similar components.

DETAILED DESCRIPTION OF THE EMBODIMENTS

Description will now be given in detail according to example embodiments disclosed herein, with reference to the accompanying drawings. For the sake of brief description with reference to the drawings, the same or equivalent components may be provided with the same reference numbers, and description thereof will not be repeated.

In general, a suffix such as "module" or "unit" may be used to refer to elements or components. Use of such a suffix herein is merely intended to facilitate description of the specification, and the suffix itself is not intended to give any special meaning or function. In addition, the terminology, component "module" or "unit" refers to a hardware element such as a FPGA (field programmable gate array), ASIC (application specific integrated circuit), etc., and performs a corresponding function. It should be understood, however, that the component "module" or "unit" is not limited to a hardware element. The component "module" or "unit" may be implemented in storage media that can be designated by addresses. The component "module" or "unit" may also be configured to regenerate one or more processors. Accordingly, the component "module" or "unit" may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components "module" or "unit" may be formed by combining the small number of elements and components "module" or "unit" or may be divided into additional elements and components "module" or "unit."

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such the processor can read information from, and write information to, the storage medium. In the alternative, the storage medium may be integral to the processor. The processor and the storage medium may reside in an ASIC. The ASIC may reside in a user terminal.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
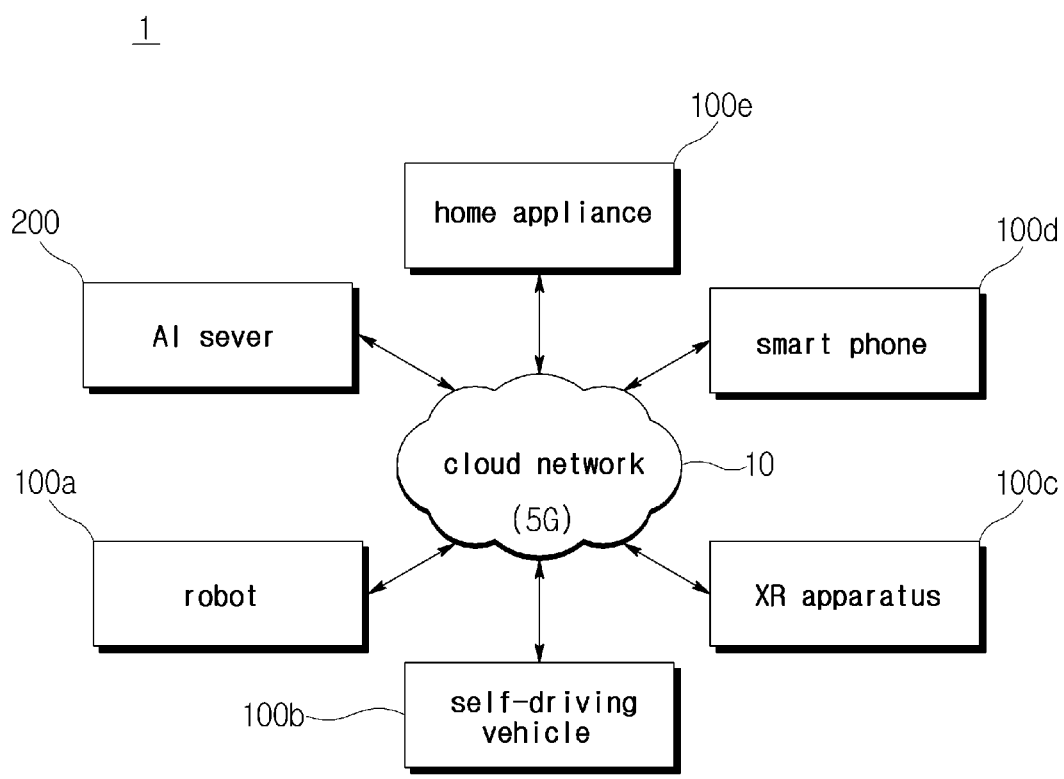

FIG. 1 is a view showing an AI system 1 according to various embodiments.

Referring to FIG. 1, in the AI system 1 at least one of an AI server 200, a robot 100a, self-driving vehicle 100b, an XR apparatus 100c, a smart phone 100d, and a home appliance 100e may be connected through a cloud network 10.

The cloud network 10 may mean a network constituting a part of cloud computing infrastructure or a network present in the cloud computing infrastructure. Herein, the cloud network 10 may be configured by using a 3G network, a 4G or LTE network, a 5G network, etc.

According to various embodiments, each electronic apparatus (100a to 100e, 200) constituting the AI system 1 may be connected with each other through the cloud network 10. According to an embodiment, each electronic apparatus (100a to 100e, 200) may perform communication with each other through a base station, and also may perform direct communication without using the base station.

The AI server 200 may include a server performing AI processing, and a server performing calculations for big data.

The AI server 200 may be connected to at least one electronic apparatus constituting an AI system 1 configured with AI-equipped electronic apparatuses which are the robot 100a, the self-driving vehicle 100b, the XR apparatus 100c, the smart phone 100d, and the home appliance 100e through the cloud network 10, and the AI server 200 may support a part of the AI processing of the connected electronic apparatuses (100a to 100e).

According to various embodiments, the AI server 200 may perform learning on an artificial neural network according to a machine learning algorithm in place of the electronic apparatus (100a to 100e), may directly store a learning model, or transmit the learning model to the electronic apparatus (100a to 100e).

According to various embodiments, the AI server 200 may receive input data from the electronic apparatus (100a to 100e), estimate a result value for the received input data by using a learning model, and generate a response or control command based on the estimated result value to transmit the same to the electronic apparatus (100a to 100e).

According to another various embodiments, the electronic apparatus (100a to 100e) may estimate a result value for the received input data by directly using a learning model, and generate a response or control command based on the estimated result value.

The self-driving vehicle 100b where a method and apparatus of the present disclosure is equipped therein may be employed as a mobile robot, a vehicle, an unmanned aerial vehicle, etc. by applying artificial intelligence thereto.

The self-driving vehicle 100b may include a self-driving control module controlling a self-driving function, and the self-driving control module may mean a software module or a chip where the same is employed in hardware. The self-driving control module may be included in the self-driving vehicle 100b as a component thereof, but may be connected to the self-driving vehicle 100b by being configured in separate hardware.

The self-driving vehicle 100b may obtain state information of the self-driving vehicle 100b, detect (recognize) a surrounding environment and objects, generate map data, determine a moving path and a driving plan, or determine operations by using sensor information obtained through various types of sensors.

Herein, in order to determine a moving path or driving plan, the self-driving vehicle 100b, similar to the robot 100a, may use sensor information obtained by using at least one sensor of a lidar, a radar, and a camera.

Particularly, the self-driving vehicle 100b may recognize an environment and objects for areas that are hidden from view or over a certain distance by receiving sensor information from external apparatuses, or by receiving information directly recognized from the external apparatuses.

The self-driving vehicle 100b may perform the above operations by using a learning model configured with at least one artificial neural network. For example, the self-driving vehicle 100b may recognize a surrounding environment and objects by using a learning model, and determine a driving path by using the recognized surrounding environment information or object information. Herein, the learning model may be obtained by directly performing learning by the self-driving vehicle 100b, or by performing learning by the external apparatus such as an AI server 200, etc.

Herein, the self-driving vehicle 100b may generate a result by directly using the learning model to perform operations. However, the self-driving vehicle 100b may transmit the sensor information to the external apparatus such as an AI server 200, and receive a result generated according thereto to perform operations.

The self-driving vehicle 100b may determine a moving path and a driving plan by using at least one map data, object information detected from the sensor information, and object information obtained from the external apparatus, and drive according to the determined moving path and the driving plan by controlling a driving part.

Map data may include object identification information on various objects (for example, roads) arranged in a space where the self-driving vehicle 100b drives. For example, the map data may include object identification information on fixed objects such as street lamps, rocks, buildings, etc. and movable objects such as vehicles, pedestrians, etc. In addition, the object identification information may include a name, a type, a distance, a position, etc.

In addition, the self-driving vehicle 100b may perform operations or drive by controlling the driving part based on the user's control/interaction. Herein, the self-driving vehicle 100b may obtain intention information on interaction according to a user's behavior or voice input, and determine a response based on the obtained intention information to perform operations.

Figure 2:
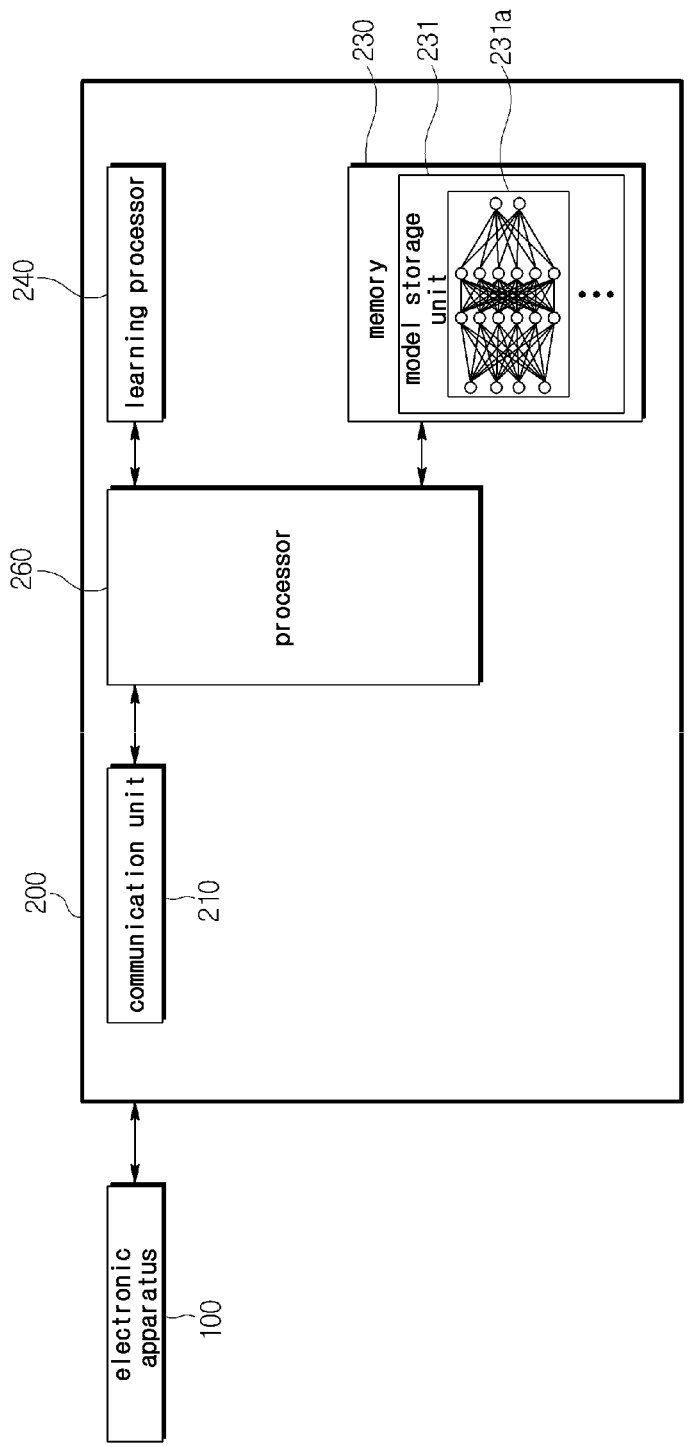

FIG. 2 is a view showing an AI server 200 including artificial intelligence technologies according to various embodiments.

Referring to FIG. 2, an AI server 200 may mean an apparatus performing learning for an artificial neural network by using a machine learning algorithm, or an apparatus using the artificial neural network for which learning is performed. Herein, the AI server 200 may perform distributed processing by being configured with a plurality of servers, or may be defined as a 5G network. According to an embodiment, the AI server 200 may be included in the electronic apparatus 100 as a component thereof. In addition, at least a part of AI processing of the AI server 200 may be performed in conjunction with the electronic apparatus 100. In an example, when computing power of the electronic apparatus 100 is insufficient, the electronic apparatus 100 may send a request for performing at least a part or the entire AI processing to the AI server 200.

The AI server 200 may include a communication unit 210, a memory 230, a learning processor 240, and a processor 260.

The communication unit 210 may transmit and receive data to/from external apparatuses such as the electronic apparatus 100, etc. According to an embodiment, the communication unit 210 may transmit/receive data to/from an external apparatus through the cloud network 10, or according to another embodiment, the communication unit 210 may directly transmit/receive data to/from an external apparatus.

The memory 230 may include a model storage 231. The model storage 231 may be for storing a model (or artificial neural network, 231a) for which learning is ongoing or performed by the learning processor 240.

The learning processor 240 may generate a learning model where learning for an artificial neural network 231a is performed by using learning data. A learning model may be used by being integrated in the AI server 200 of the artificial neural network, or by being integrated in the external apparatus such as the electronic apparatus 100, etc.

The learning model may be employed in hardware, software, or combination thereof. When a part or the entire of the learning model is employed in software, at least one instruction constituting the learning model may be stored in the memory 230.

The processor 260 may estimate a result value for new input data by using the learning model, and generate a response or control command based on the estimated result value.

Figure 3:
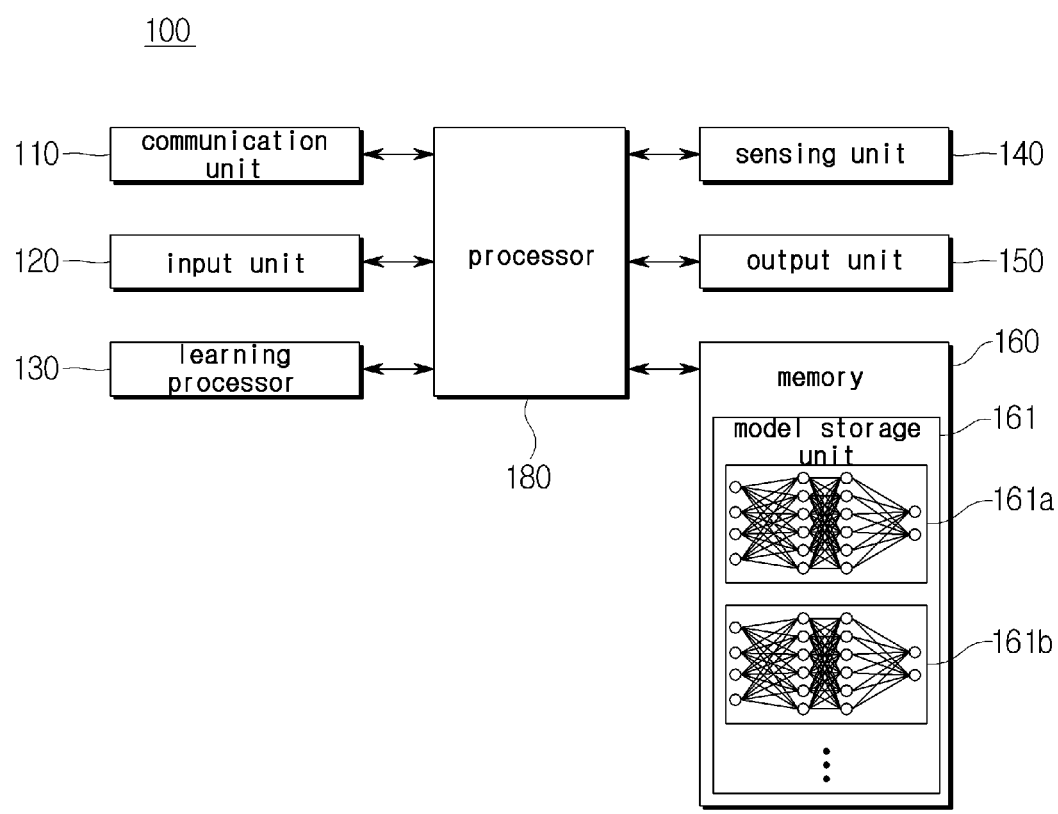

FIG. 3 is a view showing an electronic apparatus 100 determining a possibility of a vehicle collision according to various embodiments.

The electronic apparatus 100 may be employed in a fixed or movable type apparatus such as TVs, projectors, mobile smart phones 100d), desktop computers, laptop PCs, digital terminals, PDAs (personal digital assistants), PMPs (portable multimedia player), navigations, tablet PCs, wearable apparatuses, set-top boxes (STB), DMB (digital multimedia broadcasting) receivers, radios, washing machines, refrigerators, digital signage, robots, vehicles, XR apparatuses. Alternatively, the electronic apparatus 100 may be one component, chip, module, or ECU (electronic control unit) provided in the above-described fixed or movable type apparatus to perform functions. The AI-equipped electronic apparatus 100 may be referred to as an AI apparatus.

Referring to FIG. 3, the AI-equipped electronic apparatus may include a communication unit 110, an input unit 120, a learning processor 130, a sensing unit 140, an output unit 150, a memory 160, and a processor 180.

According to various embodiments, the communication unit 110 may transmit/receive data to/from external apparatuses such as another AI-equipped electronic apparatuses or AI server 200 by using wired/wireless communication. For example, the communication unit 110 may transmit and receive sensor information, a user input, a learning model, control signals, etc. to/from external apparatuses.

Herein, the communication unit 110 may use wireless communication including GSM (global system for mobile communication), CDMA (code division multi access), LTE (long term evolution), 5G (fifth generation communication), WLAN (wireless LAN), Wi-Fi (wireless-fidelity), DSRC (dedicated short range communication), BLUETOOTH™, RFID (radio frequency identification), infrared data association (IrDA), ZIGBEE, and NFC (near field communication) or wired communication including LAN (local area network), WAN (wide area network), MAN (metropolitan area network), and Ethernet.

According to various embodiments, the input unit 120 may be for obtaining various types of data. The input unit 120 may include a camera for an image signal input, a microphone for receiving audio signals, and a user input unit for receiving information from the user. Herein, the camera or microphone may be used as a sensor, and signals obtained from the camera or microphone may be referred to as sensing data or sensor information. Accordingly, the camera or microphone may be included in the sensing unit 140.

The input unit 120 may be for obtaining input data used for outputting that is performed by using learning data and a learning model for model learning. The input unit 120 may be for obtaining input data that is not processed. Herein, the processor 180 or learning processor 130 may obtain an input feature from input data as preprocessing.

According to various embodiments, the learning processor 130 may perform learning for models 161*a* and 161*b* which are configured with an artificial neural network by using learning data. According to an embodiment, the learning processor 130 may perform learning for models 161*a* and 161*b* which are configured with a plurality of artificial neural networks. Herein, learning data for each model may vary according to a purpose of each model. Herein, the artificial neural network for which learning is performed may be referred to as a learning model. The learning model may be employed in hardware, software, or combination thereof. The learning model may be used for estimating a result value for new input data other than learning data, and the estimated value may be used as a reference for performing a certain operation. According to an embodiment, the learning processor 130 may perform AI processing in conjunction with a learning processor 240 of the AI server 200.

The learning processor 130 may be employed by being integrated with the processor 180 of the electronic apparatus 100. In addition, a learning model executed in the learning processor 130 may be employed in hardware, software, or combination thereof. When a part or the entire of a learning model is employed in software, at least one instruction constituting the learning model may be stored in the memory 160, an external memory directly connected to the electronic apparatus 100, or a memory maintained in the external apparatus. The learning processor 130 may execute an artificial intelligence processing program by loading a corresponding instruction from the memory and executing the instruction.

According to various embodiments, the sensing unit 140 may obtain at least one of internal information of the electronic apparatus 100, surrounding environmental information of the electronic apparatus 100, and user information by using various sensors.

Herein, the sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, a camera, a lidar, a radar, a pressure sensor, a force sensor, etc.

According to various embodiments, the output unit 150 may generate a visual, acoustic, or tactile output. The output unit 150 may include a display device outputting visual information, a speaker outputting acoustic information, a haptic module outputting tactile information, etc.

According to various embodiments, in the memory 160, data providing various functions of the electronic apparatus 100 may be stored. For example, in the memory 160, input data obtained through the input unit 120, learning data, learning models, learning history, instructions for the learning processor 130, instructions for the processor 180, a model (or artificial neural network) for which leaning is ongoing or performed by the learning processor 130, etc. may be stored.

According to various embodiments, the processor 180 may determine at least one executable operation of the electronic apparatus 100 which is determined based on information determined or generated by using a data analysis algorithm or machine learning algorithm. In addition, the processor 180 may perform the determined operation by controlling components of the electronic apparatus 100. A program used by the processor 180 when performing the operation may be stored in the memory 160.

The processor 180 may request, retrieve, receive, or use data of the learning processor 130 or memory 160, and control configurations of the electronic apparatus 100 to perform the estimated operation of the at least one executable operation, or an operation that is determined to be desirable.

In order to perform the determined operation, the processor 180 may generate, when association with an external apparatus is required, a control signal for controlling the corresponding external apparatus, and transmit the generated control signal to the corresponding external apparatus.

The processor 180 may obtain intention information on the user's input, and determine a user's requirement based on the obtained intention information.

In an example, the processor 180 may obtain intention information in association with the user's input by using at least one of a STT (speech-to-text) engine converting a voice input into text strings, and a natural language processing (NLP) engine obtaining intention information of natural language. A part of the at least one of the STT engine and the NLP engine may be configured with the artificial neural network for which learning is performed according to a machine learning algorithm. In addition, for at least one of the STT engine and the NLP engine, learning is performed by the learning processor 130, learning is performed by the learning processor 240 of the AI server 200, or learning is performed through distributed processing of the above processors.

The processor 180 may collect record information including operation content of the electronic apparatus 100 user's feedback in association with the operation, etc. to store in the memory 160 or learning processor 130, or transmit to the external apparatus such as AI server 200, etc. The collected record information may be used for updating a learning model.

The processor 180 may control a part of components of the electronic apparatus 100 to execute application programs stored in the memory 160. In addition, the processor 180 may operate configurations of the electronic apparatus 100 by combining at least two thereof to execute the application programs.

Figure 4:
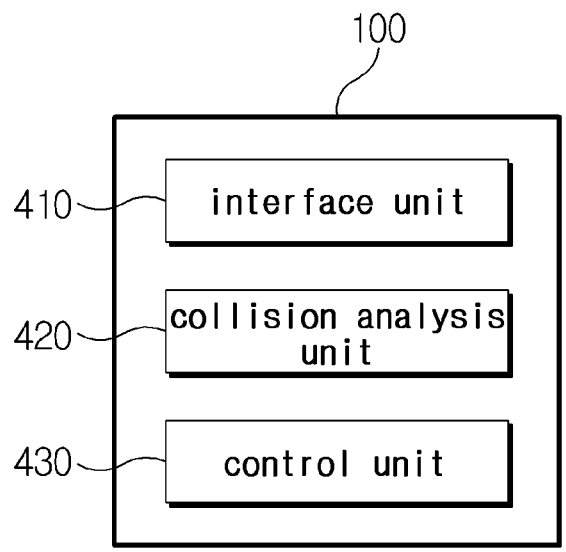

FIG. 10 is a view of a flowchart showing functions for performing a method of determining, by at least one of a processor and a learning processor of the electronic apparatus 100, a possibility of a vehicle collision proposed in the present disclosure according to various embodiments. A block diagram of FIG. 4 is a view of an example briefly showing software configurations for analyzing, by the electronic apparatus 100, a collision between vehicles by using a deep neural network. According to an embodiment, some configurations may be omitted, and other configurations not shown may be added according to another embodiment. In addition, some configurations may be employed by being integrated into one chip, or a single configuration may be divided and employed as a plurality of chips or circuits. Each configuration shown in FIG. 4 may be employed in a separate program or some configurations may be employed in one program by being closely related with each other.

Referring to FIG. 4, at least one of the processor 180 and the learning processor 130 of the electronic apparatus 100 may perform a function of an interface unit 410, a collision analysis unit 420, and a control unit 430.

According to various embodiments, the interface unit 410 may obtain sensing data including image data used for collision analysis. The interface unit 410 may obtain image data required for collision analysis by directly receiving an image signal obtained through the camera of the input unit 120 or by loading an image stored in the memory 160 by the input unit 120. In addition, the interface unit 410 may obtain additional sensing data detected by the sensor included in the sensing unit 140. Sensing data may include information on a distance with a preceding vehicle. In addition, the interface unit 410 may obtain image information from surrounding vehicles through the communication unit 110. According to an embodiment, the interface unit 410 may periodically obtain image information from surrounding vehicles. According to another embodiment, the interface unit 410 may obtain information on collision possibility determination and image information transmitted from the surrounding vehicle when the surrounding vehicle determines that a collision is expected.

The interface unit 410 may transfer an image obtained through the camera of the input unit 120 to surrounding vehicles through the communication unit 110. According to an embodiment, the interface unit 410 may periodically transfer image information to surrounding vehicles. According to another embodiment, the interface unit 410 may transfer information on collision possibility determination and image information to a vehicle when the collision analysis unit 420 determines that a collision with the corresponding surrounding vehicle is expected.

The interface unit 410 may inform the driver of the determination result of the collision possibility of his or her vehicle. According to an embodiment, when a velocity of the vehicle is decreased or the vehicle is stopped by the control unit 430 due to the collision possibility, the interface unit 410 may output the corresponding result in visual, acoustic, or tactile information through the output unit 150.

According to various embodiments, the collision analysis unit 420 may determine a collision possibility based on image data obtained through the interface unit 410. The collision analysis unit 420 may determine a collision possibility of vehicle itself and a collision possibility of a surrounding vehicle.

The collision analysis unit 420 may determine a collision possibility of the vehicle itself based on image data obtained through the interface unit 410. The collision analysis unit 420 may obtain a distance with a vehicle (for example: preceding vehicle) where a collision between the vehicle itself and the corresponding vehicle is expected, a velocity or relative velocity of the vehicle where a collision between the vehicle itself and the corresponding vehicle is expected, a vehicle type, and a vehicle state (for example: straight ahead, left turn, right turn) based on image data. According to an embodiment, the collision analysis unit 420 may obtain a distance with a vehicle where a collision therewith is expected, a velocity or relative velocity of the vehicle, a vehicle type, and a vehicle state on the basis images captured by the camera of the input unit 120 of the vehicle itself. In order to obtain the above-described information, the collision analysis unit 420 may additionally use sensing data in addition to the image data. According to another embodiment, the collision analysis unit 420 may obtain a distance with a vehicle where a collision therewith is expected, a velocity or relative velocity of the vehicle, a vehicle type, and a vehicle state based on image information received from the surrounding vehicle through the communication unit 110.

The collision analysis unit 420 may determine a collision possibility of the vehicle itself based on the obtained distance with the vehicle where a collision between the vehicle itself and the corresponding vehicle is expected, velocity or relative velocity of the vehicle, vehicle type, and vehicle state. According to an embodiment, the collision analysis unit 420 may determine a collision possibility by using an artificial neural network model for which learning is performed to which a distance with a vehicle where a collision therewith is expected, a velocity or relative velocity of the vehicle, a vehicle type, and a vehicle state are input. An artificial neural network model for which learning is performed may be an artificial neural network model for which learning is performed based on supervised learning based on a distance between vehicles, a velocity or relative velocity of two vehicles, a vehicle type, a vehicle state, and label information representing whether a collision has occurred. Accordingly, an artificial neural network model for which learning is performed may determine a collision possibility between two vehicles when a distance between vehicles, a velocity or relative velocity of two vehicles, a vehicle type, and a vehicle state are input.

According to an embodiment, an artificial neural network model for which learning is performed may be used, as shown in FIG. 3, by the collision analysis unit 420 by being stored in the memory 160 of the electronic apparatus 100. According to another embodiment, an artificial neural network model for which learning is performed may be executed, as shown in FIG. 2, in the AI server 200, and the collision analysis unit 420 may transfer a distance between the vehicle itself and a preceding vehicle, a velocity or relative velocity of the vehicle itself and the preceding vehicle, and a vehicle type to the AI server 200 through the communication unit 110, and obtain a determination result from the AI server 200. When an artificial neural network model for which learning is performed is executed in the AI server 200, communication between the electronic apparatus 100 and the AI server 200 has to be performed as shortly as possible to determine in real time a collision possibility.

The collision analysis unit 420 may additionally estimate an operation of the vehicle where a collision therewith is expected. For example, the collision analysis unit 420 may estimate whether the vehicle where a collision therewith is expected stops, decreases in velocity, or executes an avoidance operation based on at least one of image data and sensing data. The collision analysis unit 420 may further include an additional artificial neural network model for which learning is performed in advance for the above estimation.

When a collision is expected according to the determination result, the collision analysis unit 420 may determine how to operate the vehicle itself. For example, the collision analysis unit 420 may determine whether to stop the vehicle, whether to decrease in velocity, or whether to execute an avoidance operation. According to an embodiment, the collision analysis unit 420 may determine an operation of the vehicle itself by referring to the operation of the other party vehicle where a collision therewith is expected.

The collision analysis unit 420 may further include an additional artificial neural network model for which learning is performed in advance to determine an operation to be performed when a collision is expected. Alternatively, the collision analysis unit 420 may include an artificial neural network model for which learning is performed in advance which determines a collision possibility in conjunction with the above-described artificial neural network model determining the collision possibility, and at the same time determines an action of the vehicle itself to be performed when a collision is expected.

According to various embodiments, the collision analysis unit 420 may determine a collision possibility with surrounding vehicles based on image data related to the surrounding vehicles obtained through the interface unit 410. Herein, image data may be image data obtained through the camera of the input unit 120, or may be image data received from the surrounding vehicle through the communication unit 110.

According to an embodiment, the collision analysis unit 420 may obtain a distance between a surrounding vehicle and a preceding vehicle of the corresponding surrounding vehicle, a velocity or relative velocity of the surrounding vehicle and the preceding vehicle, and a type of the corresponding vehicle from image data obtained through the camera of the input unit 120. Herein, the preceding vehicle of the corresponding surrounding vehicle may be the vehicle itself or another vehicle. The collision analysis unit 420 may determine a collision possibility by inputting the obtained distance between the surrounding vehicle and the preceding vehicle of the corresponding surrounding vehicle, velocity or relative velocity of the surrounding vehicle and the preceding vehicle, and type of the corresponding vehicle to an artificial neural network model for which learning is performed in advance.

According to another embodiment, the collision analysis unit 420 may obtain a distance between a surrounding vehicle and a preceding vehicle of the corresponding surrounding vehicle, a velocity or relative velocity of the surrounding vehicle and the preceding vehicle, and a type of the corresponding vehicle from image data received from the surrounding vehicle through the communication unit 110. Herein, the preceding vehicle of the corresponding surrounding vehicle may be the vehicle itself or another vehicle. The collision analysis unit 420 may determine a collision possibility by inputting the obtained distance between the surrounding vehicle and the preceding vehicle of the corresponding surrounding vehicle, velocity or relative velocity of the surrounding vehicle and the preceding vehicle, and type of the corresponding vehicle to an artificial neural network model for which learning is performed in advance.

Analyzing a collision possibility by the collision analysis unit 420 based on image data received from the surrounding vehicle may be performed by receiving a request for the same from the surrounding vehicle or may be periodically performed. For example, the surrounding vehicle may send a request for determining a collision possibility to verify the determination result of own collision possibility. Herein, the collision analysis unit 420 may determine a collision possibility with the corresponding surrounding vehicle based on image data received from the surrounding vehicle.

According to various embodiments, the control unit 430 may control the vehicle itself to decrease in velocity by controlling at least one of a brake and an accelerator of the vehicle itself based on the determination result of the collision analysis unit 420. Additionally, the control unit 430 may control the vehicle itself to stop or decrease in velocity by controlling at least one of a brake and an accelerator of the vehicle itself based on information on collision possibility determination which is received from the surrounding vehicle. According to an embodiment, first, the control unit 430 may control the vehicle itself to decrease in velocity based on information on collision possibility determination which is received from the surrounding vehicle, and then control the vehicle itself to stop based on the determination result of the collision analysis unit 420.

Figure 5:
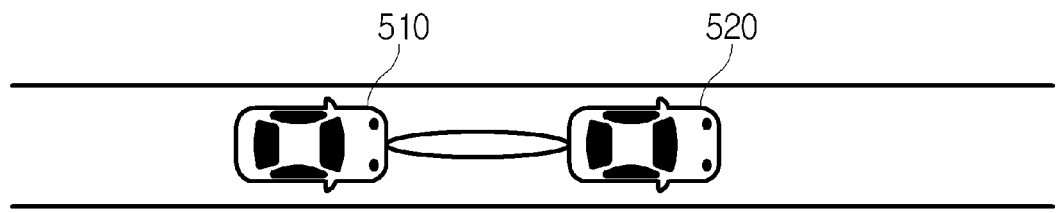

FIG. 5 is a view showing an example of determining a collision possibility between a first vehicle 510 and a second preceding vehicle 520.

Referring to FIG. 5, an electronic apparatus 100 of a first vehicle 510 may obtain an image including a preceding second vehicle 520 by using the camera of the input unit 120. The electronic apparatus 100 of the first vehicle 510 may determine a collision possibility with the second vehicle 520 based on the corresponding images.

According to another embodiment, the electronic apparatus 100 of the first vehicle 510 may transfer an image captured by the camera of the input unit 120 to the second vehicle 520 through the communication unit 110. The electronic apparatus 100 of the second vehicle 520 may determine a collision possibility between the second vehicle 520 itself and the first vehicle 510 based on the corresponding image, and transfer the determination result to the electronic apparatus 100 of the first vehicle 510. According to an embodiment, when it is determined that a collision is expected, the electronic apparatus 100 of the second vehicle 520 may transmit a signal indicating that a collision is expected and the image used for the analysis to the electronic apparatus 100 of the first vehicle 510, otherwise, may not transmit any signal. The electronic apparatus 100 of the first vehicle 510 may determine again a collision possibility based on the image received with the determination result indicating that a collision with the second vehicle 520 is expected.

According to another embodiment, the electronic apparatus 100 of the first vehicle 510 may receive an image including the first vehicle 510 which is captured by the camera of the input unit 120 of the electronic apparatus 100 of the second vehicle 520 through the communication unit 110. Additionally, the electronic apparatus 100 of the first vehicle 510 may receive the corresponding image with the result for the collision possibility determined by the electronic apparatus 100 of the second vehicle 520. According to an embodiment, when the electronic apparatus 100 of the first vehicle 510 receives a signal indicating that a collision is expected, a collision possibility may be determined based on an image received from the second vehicle 520. According to another embodiment, a collision possibility may be determined periodically based on an image received from the second vehicle 520.

Figure 6:
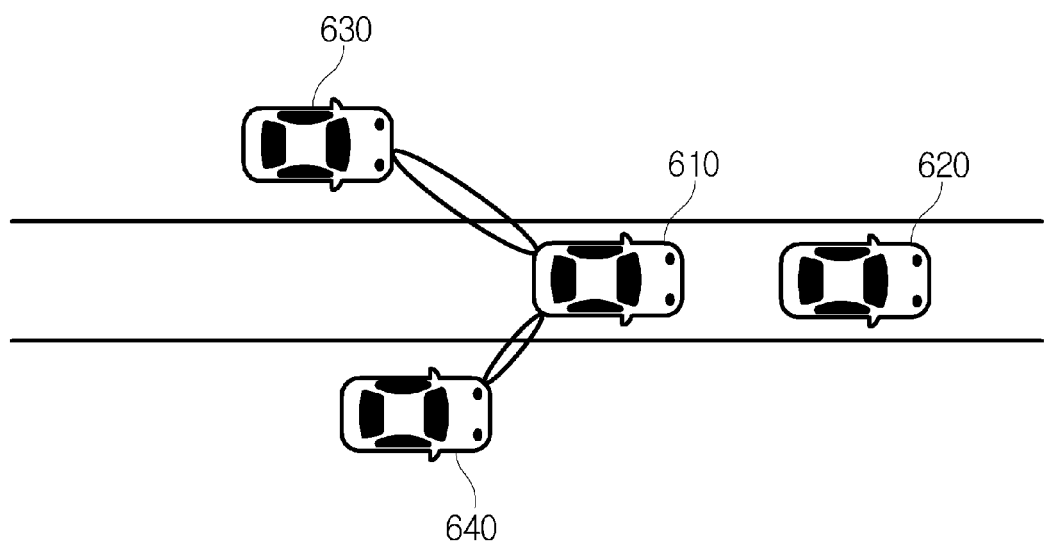

FIG. 6 is a view showing an example of determining a collision possibility between a preceding first vehicle 610 and a second vehicle 620 by an operation in conjunction with surrounding vehicles 630 and 640.

Referring to FIG. 6, the electronic apparatus 100 of the first vehicle 610 may obtain an image including the preceding second vehicle 620 by using the camera of the input unit 120. The electronic apparatus 100 of the first vehicle 610 may determine a collision possibility with the second vehicle 620 based on the corresponding image.

According to another embodiment, the electronic apparatus 100 of the first vehicle 610 may transmit an image including the preceding second vehicle 620 which is captured by using the camera of the input unit 120 to surrounding vehicles 630 and 640 through the communication unit 110. The electronic apparatus 100 of each of the surrounding vehicles 630 and 640 may determine a collision possibility between the first vehicle 610 and the second vehicle 620 based on the received image, and transfer the determination result to the electronic apparatus 100 of the first vehicle 610. According to an embodiment, when it is determined that a collision is expected, the electronic apparatus 100 of each of the surrounding vehicles 630 and 640 may transfer a signal indicating that a collision is expected and the image used for the analysis to the electronic apparatus 100 of the first vehicle 610, otherwise, may not transmit any signal. The electronic apparatus 100 of the first vehicle 610 may determine again a collision possibility based on the image received with the determination results, which are determined by the surrounding vehicles 630 and 640, indicating that a collision is expected.

According to another embodiment, the electronic apparatus 100 of the first vehicle 610 may receive an image including the first vehicle 610 and the second vehicle 620 which is captured by the camera of the input unit 120 of the electronic apparatus 100 of each of the surrounding vehicles 630 and 640 through the communication unit 110. Additionally, the electronic apparatus 100 of the first vehicle 610 may receive the corresponding image with the result for the collision possibility determined by each of the electronic apparatus 100 of the surrounding vehicles 630 and 640. According to an embodiment, when the electronic apparatus 100 of the first vehicle 610 receives a signal indicating that a collision is expected, a collision possibility may be determined based on images received from the surrounding vehicles 630 and 640. According to another embodiment, a collision possibility may be determined periodically based on images received from the surrounding vehicles 630 and 640.

Figure 7:
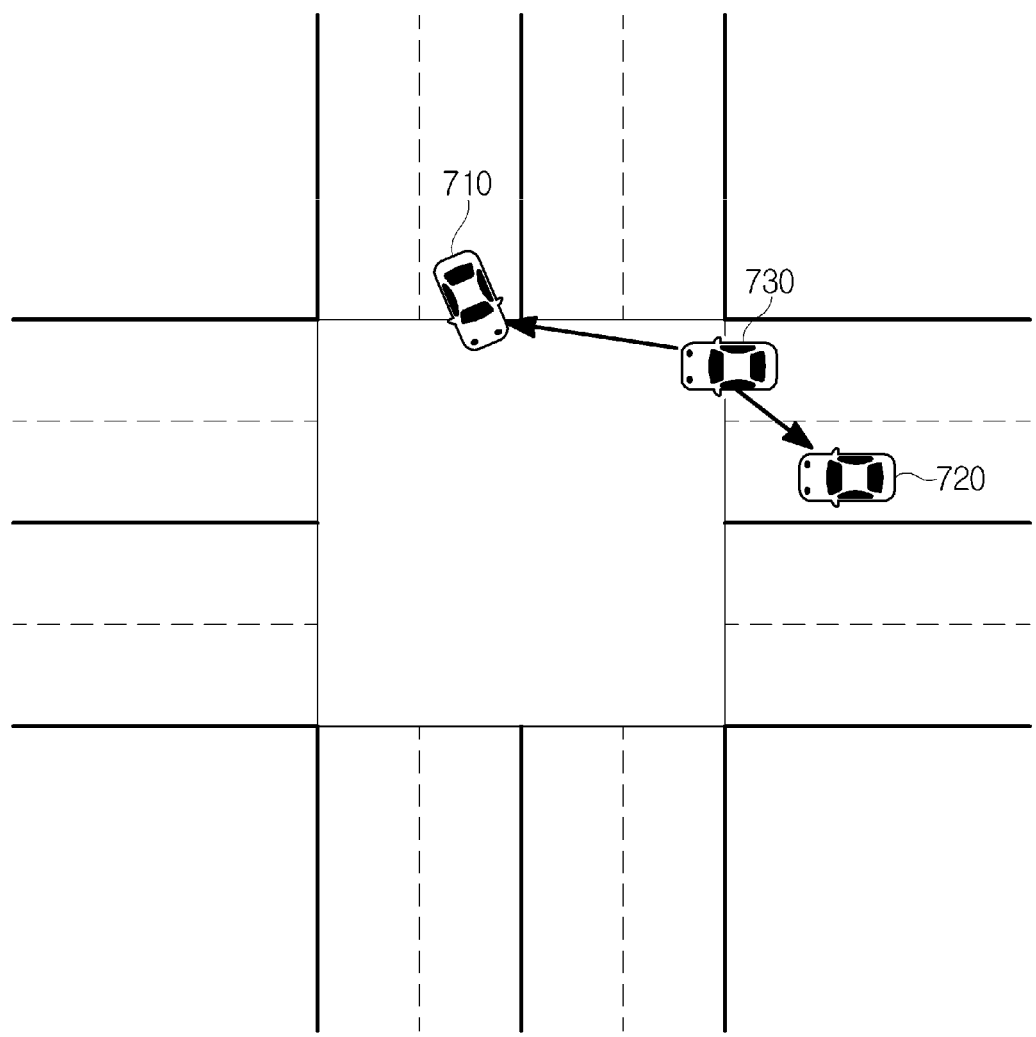

FIG. 7 is a view showing an example of determining, by a surrounding vehicle 730, a collision possibility between a first vehicle 710 and a second vehicle 720 at an intersection.

Referring to FIG. 7, at the intersection, the first vehicle 710 may wish to turn left and the second vehicle 720 may wish to go straight. Herein, the first vehicle 710 cannot detect the second vehicle 720, and the second vehicle 720 cannot detect the first vehicle 710. The surrounding vehicle 730 may obtain an image including the first vehicle 710 and the second vehicle 720, and determine a collision possibility between the first vehicle 710 and the second vehicle 720 based on the obtained image. The surrounding vehicle 730 may inform the first vehicle 710 that a collision is expected by providing the image including the second vehicle 720 on the basis that a collision is expected. In addition, the surrounding vehicle 730 may inform the second vehicle 720 that a collision is expected by providing the image including the first vehicle 710. Additionally, the surrounding vehicle 730 may provide to the first vehicle 710 and the second vehicle 720 a velocity of the other party vehicle where a collision therewith is expected, a distance with the other party vehicle, and information on a movement direction of the other party vehicle with the image. For example, the surrounding vehicle 730 may provide to the first vehicle 710 information indicating that a velocity of the other party vehicle is 40 km/s, a distance with the other party vehicle is 20M, and a movement direction of the other party vehicle is going straight through the communication unit 110 of the electronic apparatus 100. In addition, the surrounding vehicle 730 provide to the second vehicle 720 information indicating that a velocity of the other party vehicle is 30 km/s, a distance with the other party vehicle is 20M, and a movement direction of the other party vehicle is turning left through the communication unit 110 of the electronic apparatus 100.

Each of the first vehicle 710 and the second vehicle 720 may determine a collision possibility in the collision analysis unit 420 of the electronic apparatus 100 based on a signal indicating that a collision is expected and an image which are received from the surrounding vehicle 730, and decrease in velocity or stop according to the analysis result.

Figure 8:
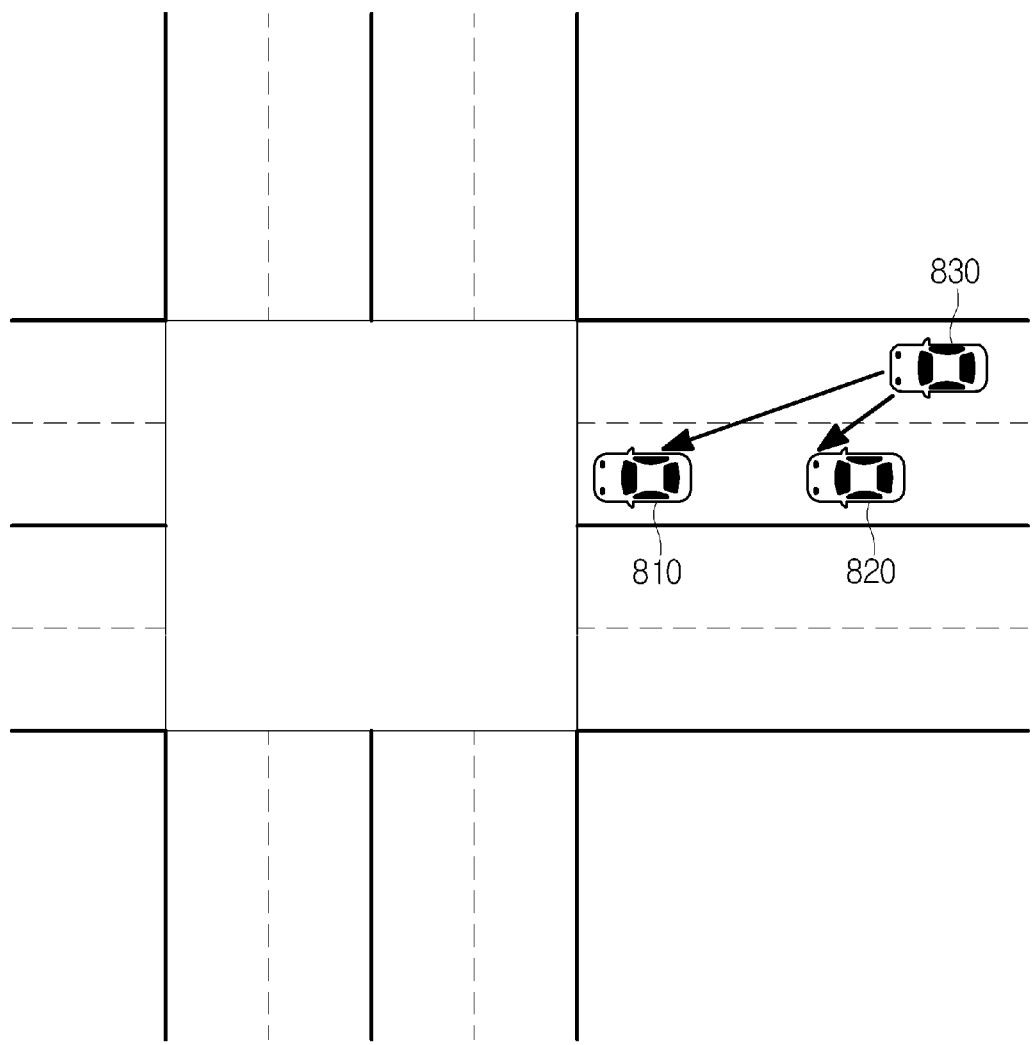

FIG. 8 is a view showing another example of determining, by a surrounding vehicle 830, a collision possibility between a first vehicle 810 and a second vehicle 820 at an intersection.

Referring to FIG. 8, at the intersection, the first vehicle 810 at the same lane may wish to turn left and the second vehicle 820 may wish to go straight. The surrounding vehicle 830 may obtain an image including the first vehicle 810 and the second vehicle 820, and determine that a collision is expected between the first vehicle 810 and the second vehicle 820 based on the obtained image. The surrounding vehicle 830 may inform the first vehicle 810 that a collision is expected by providing the image including the second vehicle 820 on the basis that a collision is expected. In addition, the surrounding vehicle 830 may inform the second vehicle 820 that a collision is expected by providing the image including the first vehicle 810. Additionally, the surrounding vehicle 830 may provide to the first vehicle 810 and the second vehicle 820 a velocity of the other party vehicle where a collision therewith is expected, a distance with the other party vehicle, information on a movement direction of the other party vehicle, and an operational method for avoiding the collision with the image. For example, the surrounding vehicle 830 may provide to the first vehicle 810 information indicating that a velocity of the other party vehicle is 40 km/s, a distance with the other party vehicle is 20M, a movement direction of the other party vehicle is going straight, and it is preferable to turn left quickly to avoid the collision through the communication unit 110 of the electronic apparatus 100. In addition, the surrounding vehicle 830 may provide to the second vehicle 820 information indicating that a velocity of the other party vehicle is 35 km/s, a distance with the other party vehicle is 20M, a movement direction of the other party vehicle is turning left, and it is preferable to decrease in velocity to avoid the collision through the communication unit 110 of the electronic apparatus 100.

Each of the first vehicle 810 and the second vehicle 820 may perform an avoidance operation according to an operational method provided from the surrounding vehicle 830 based on information related to the other party vehicle which is received from the surrounding vehicle 830, or may analyze a collision possibility in the collision analysis unit 420 of the electronic apparatus 100 based on the received image and perform an operation for avoiding the collision according to the analysis result.

Figure 9:
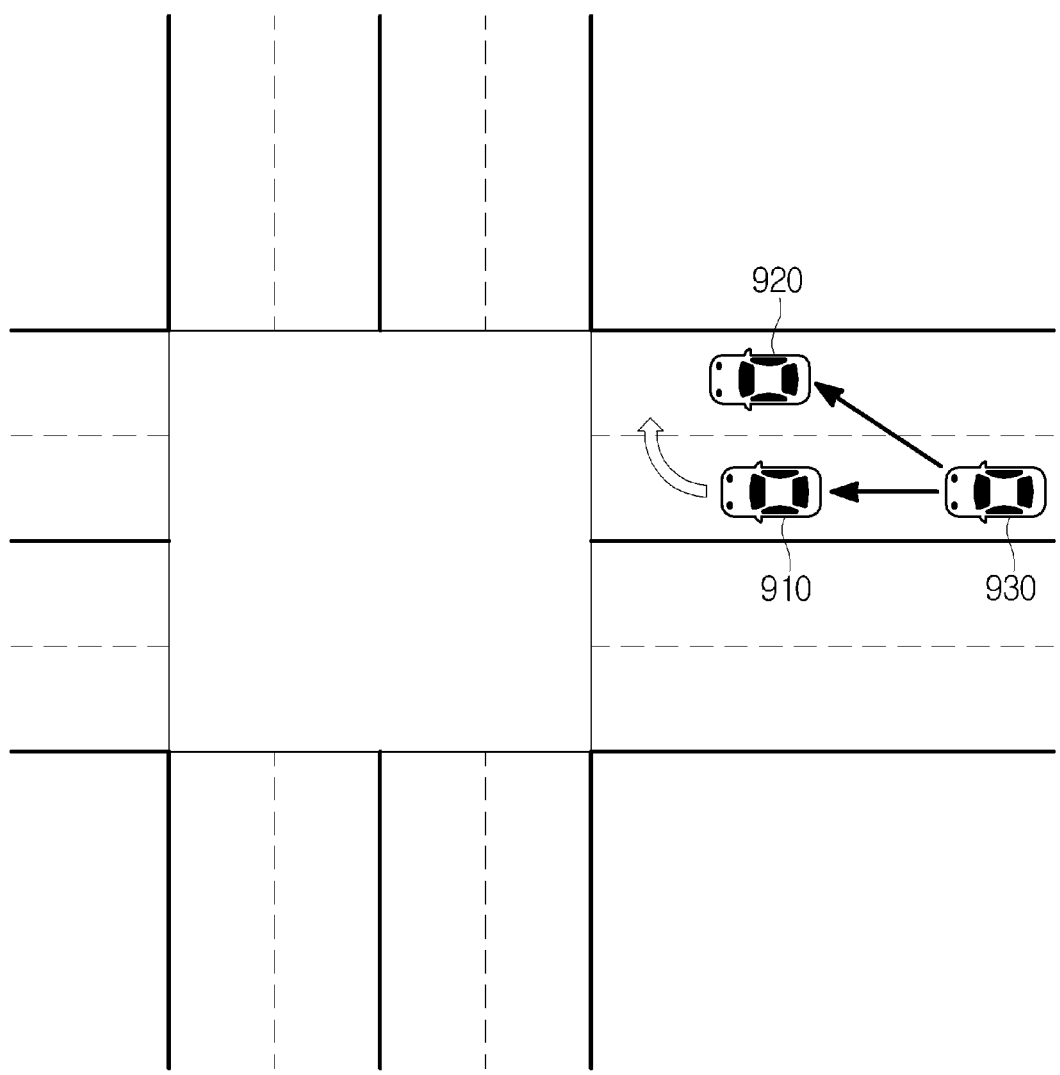

FIG. 9 is a view showing an example of determining, by a surrounding vehicle 930, a collision possibility between a first vehicle 910 and a second vehicle 920.

Referring to FIG. 9, a first vehicle 910 in the first lane may wish to change lanes to the second lane where a second vehicle 920 is present. The surrounding vehicle 930 may obtain an image including the first vehicle 910 and the second vehicle 920, and determine that a collision is expected between the first vehicle 910 and the second vehicle 920 based on the obtained image. The surrounding vehicle 930 may inform the first vehicle 910 that a collision is expected by providing the image including the second vehicle 920 on the basis that a collision is expected. In addition, the surrounding vehicle 930 may inform the second vehicle 920 that a collision is expected by providing the image including the first vehicle 910. Additionally, the surrounding vehicle 930 may provide to the first vehicle 910 and the second vehicle 920 a velocity of the other party vehicle where a collision therewith is expected, a distance with the other party vehicle, information on a movement direction of the other party vehicle, and an operational method for avoiding the collision with the image. For example, the surrounding vehicle 930 may provide to the first vehicle 910 information that a velocity of the other party vehicle is 35 km/s, a distance with the other party vehicle is 5M, a movement direction of the other party vehicle is going straight, and it is preferable to stand by once instead of making lane changes to avoid the collision through the communication unit 110 of the electronic apparatus 100. In addition, the surrounding vehicle 930 may provide to the second vehicle 920 information indicating that a velocity of the other party vehicle is 45 km/s, a distance with the other party vehicle is 5M, a movement direction of the other party vehicle is making lane changes, and it is preferable to decrease in velocity to avoid the collision through the communication unit 110 of the electronic apparatus 100.

Each of the first vehicle 910 and the second vehicle 920 may perform an avoidance operation according to an operational method provided from the surrounding vehicle 930 based on information related to the other party vehicle which is received from the surrounding vehicle 930 or may analyze a collision possibility in the collision analysis unit 420 of the electronic apparatus 100 based on the received image and perform an operation for avoiding the collision according to the analysis result.

As described above, in order to avoid a collision between vehicle itself and another vehicle, the electronic apparatus 100 may perform determination based on an image obtained by the input unit 120, and also by additionally using an image captured by the surrounding vehicle. Accordingly, accidents can be significantly reduced.

According to various embodiments, when the collision analysis unit 420 determines that a collision is not expected, but a signal indicating that a collision is expected is received from the surrounding vehicle, the electronic apparatus 100 may determine that a failure has occurred in at least one of the sensor of the vehicle including the camera that captures an image, and an algorithm of determining a collision possibility, and perform maintenance for the same.

According to various embodiments, an electronic apparatus provided in a first vehicle(for example: electronic apparatus 100 of FIG. 3) for determining a collision possibility may comprise an input unit (for example: input unit 120 of the FIG. 3) configured to receive surrounding information of the first vehicle, a communication unit(for example: communication unit 110 of FIG. 3) configured to communicate with at least one surrounding vehicle around the first vehicle; and at least one processor(for example: processor 180 and learning processor 130 of FIG. 3) configured to operate in conjunction with the input unit and the communication unit.

According to various embodiments, the at least one processor may be further configured to receive a first image via the input unit, receive at least one second image from the at least one surrounding vehicle via the communication unit, and determine a collision possibility of the first vehicle based on the first image and the at least one second image.

According to various embodiments, the at least one processor is further configured to determine a first collision possibility factor of the first vehicle based on the first image, determine a second collision possibility factor of the first vehicle based on the at least one second image, and determine a collision is expected for the first vehicle when at least one of the first collision possibility factor and the second collision possibility factor indicates that a collision is expected or imminent.

According to various embodiments, the at least one processor is further configured to in response to determining that a collision is expected for the first vehicle, determine an avoidance action for the first vehicle to carry out to avoid the collision, wherein the avoidance action includes at least one of decreasing a speed of the first vehicle, stopping the first vehicle, and steering the first vehicle.

According to various embodiments, the at least one processor is further configured to in response to determining that the collision is expected for the first vehicle, estimate an estimated avoidance action of the at least one surrounding vehicle or another vehicle where the collision therewith is expected and determine the avoidance action for the first vehicle to avoid the collision based on the estimated avoidance action of the at least one surrounding vehicle or the another vehicle.

According to various embodiments, the at least one processor is further configured to determine a collision possibility of the at least one surrounding vehicle or another vehicle based on the first image or the at least one second image, and in response to determining that a collision is expected for the at least one surrounding vehicle or the another vehicle, transmit a signal from the communication unit of the first vehicle to the at least one surrounding vehicle or the another vehicle, the signal indicating the collision is expected for the at least one surrounding vehicle or the another vehicle According to various embodiments, the at least one processor is further configured to in response to determining that the collision is expected for the at least one surrounding vehicle or the another vehicle, determine a suggested avoidance action for the at least one surrounding vehicle or the another vehicle to avoid the collision and transmit the suggested avoidance action to the at least one surrounding vehicle or the another vehicle through the communication unit.

According to various embodiments, the at least one processor is further configured to determine at least one of the collision possibility of the first vehicle and the collision possibility of the at least one surrounding vehicle or the another vehicle based on an artificial neural network model for which learning is performed in advance.

According to various embodiments, the at least one processor is further configured to determine a distance between the first vehicle and the at least one surrounding vehicle or the another vehicle, a first velocity of the first vehicle, a second velocity of the at least one surrounding vehicle or the another vehicle, a first vehicle type of the first vehicle and a second vehicle type of the at least one surrounding vehicle or the another vehicle based on at least one of the first image and the at least one second image, and in response to inputting the distance, the first velocity, the second velocity, the first vehicle type and the second vehicle type into the artificial neural network model, determine at least one of the collision possibility of the first vehicle and the collision possibility of the at least one surrounding vehicle or the another vehicle based on an output of the artificial neural network model.

According to various embodiments, the communication unit is further configured to communicate based on at least one of dedicated short range communication, LTE, and 5G communication.

According to various embodiments, the at least one processor is further configured to determine a collision possibility of the at least one surrounding vehicle or another vehicle based on at least one of the first image and the at least one second image.

According to various embodiments, a first vehicle may comprise at least one sensor configured to obtain surrounding information of the first vehicle, an electronic apparatus for determining a collision possibility of the first vehicle and a brake driving unit configured to control the first vehicle.

FIG. 10 is a view of a flowchart determining, by the electronic apparatus 100, a collision possibility of the vehicle itself and determining an avoidance action according to various embodiments. An operation according to a flowchart shown in FIG. 10 may be employed by an electronic apparatus (for example: electronic apparatus 100 of FIG. 3) or by at least one processor of an electronic device (for example: processor 180 and learning processor 130 of FIG. 3).

Referring to FIG. 10, in 1001, the electronic apparatus 100 may obtain at least one of image information and sensing data through the input unit 120. Image information may include information on surrounding vehicles around the vehicle itself.

According to various embodiments, in 1003, the electronic apparatus 100 may determine a collision possibility (e.g., a collision possibility factor, a collision probability factor, and/or a percentage of collision likelihood) with the surrounding vehicles based on at least one of the obtained image information and sensing data. According to an embodiment, the electronic apparatus 100 may determine a collision possibility by using an artificial neural network mode for which learning is performed in advance to determine a collision possibility between vehicles. An artificial neural network model for which learning is performed in advance may be an artificial neural network model for which learning is performed based on supervised learning based on a distance between vehicles, a velocity or relative velocity of two vehicles, a vehicle type, a vehicle state, and label information representing whether a collision has occurred. Accordingly, an artificial neural network model for which learning is performed may determine a collision possibility between two vehicles when a distance between vehicles, a velocity or relative velocity of two vehicles, a vehicle type, and a vehicle state are input. Herein, a vehicle state may represent whether or not the other party vehicle is going straight, turning left or turning right. In 1001, the electronic apparatus 100 may obtain a distance with a vehicle where a collision therewith is expected, a velocity or relative velocity of the vehicle, a vehicle type, and a vehicle state based on at least one of the obtained image information and sensing data, and which are input to an artificial neural network model for which learning is performed in advance. In addition, the above-described information is input to an artificial neural network model for which learning is performed in advance, and a determination result for the collision possibility may be obtained as a result.

According to various embodiments, in 1005, when it is determined that a collision is expected (1005-YES), the electronic apparatus 100 may determine an avoidance action by proceeding 1013. In addition, it is determined that a collision is not expected (1005-NO), the electronic apparatus 100 may determine whether or not a collision possibility has been received from the surrounding vehicle by proceeding 1007.

According to various embodiments, in 1007, the electronic apparatus 100 may determine whether or not a collision possibility has been received from the surrounding vehicle, if not (1007-NO), 1001 may be proceeded. When information indicating that a collision is expected is received (1007-YES), the electronic apparatus 100 may determine a collision possibility based on an image received from the surrounding vehicle by proceeding 1009.

In 1009, the electronic apparatus 100 may obtain a distance with a vehicle where a collision therewith is expected, a velocity or relative velocity of the vehicle, a vehicle type, and a vehicle state based on the image received from the surrounding vehicle, and determine a collision possibility by inputting the obtained information to an artificial neural network mode for which learning is performed in advance.

In 1011, when it is determined that a collision is not expected (1011-NO), the electronic apparatus 100 may proceed 1001, otherwise (1011-YES), 1013 may be proceeded.

In 1013, the electronic apparatus 100 may determine an avoidance action based on the determination result that a collision is expected. An avoidance action may include an avoidance operation of making changes in lanes, and an operation of decreasing the vehicle itself in velocity, or stopping the vehicle itself.

In 1013, the electronic apparatus 100 may additionally estimate an operation of the other party vehicle where a collision therewith is expected. For example, the electronic apparatus 100 may estimate whether the other party vehicle will stop, decreases in velocity, or performs an avoidance operation. The electronic apparatus 100 may use an additional artificial neural network model for which learning is performed in advance for the above estimation. In addition, the electronic apparatus 100 may refer to the estimated avoidance operation of the other party vehicle when determining an avoidance action of vehicle itself.

The control unit 430 of the electronic apparatus 100 may control the vehicle itself to perform the determined avoidance action.

FIG. 11 is a view of a flowchart determining, by the electronic apparatus 100, a collision possibility of a surrounding vehicle according to various embodiments. An operation according to a flowchart shown in FIG. 11 may be employed by an electronic apparatus (for example: electronic apparatus 100 of FIG. 3) or by at least one processor of an electronic device (for example: processor 180 and learning processor 130 of FIG. 3).

Referring to FIG. 11, in 1101, the electronic apparatus 100 may determine a collision possibility (e.g., a collision possibility factor or a collision probability value) of a surrounding vehicle. According to an embodiment, the electronic apparatus 100 may: receive a request for determining a collision possibility and at least one of image data and sensing data obtained in the surrounding vehicle from the surrounding vehicle; and determine a collision possibility of the corresponding surrounding vehicle based on at least one of the received image data and sensing data. The electronic apparatus 100 may: determine a collision possibility of the corresponding surrounding vehicle by using an artificial neural network model for which learning is performed in advance to determine a collision possibility of the vehicle itself. For example, the electronic apparatus 100 may: identify a vehicle where a collision with the corresponding surrounding vehicle is expected from at least one of the received image data and sensing data; obtain a distance between two vehicles, a velocity or relative velocity of the two vehicles, a vehicle type, and a vehicle state; and determine a collision possibility by inputting the obtained information to an artificial neural network model for which learning is performed in advance.

In addition, in 1101, the electronic apparatus 100 may determine a collision possibility of the corresponding surrounding vehicle through a relation between surrounding vehicles included in an image captured by the vehicle itself. The electronic apparatus 100 may obtain a distance between two vehicles included in an image captured by the vehicle itself, a velocity or relative velocity of two vehicles, a vehicle type, and a vehicle state, and determined a collision possibility by inputting the obtained information to an artificial neural network model for which learning is performed in advance.

According to various embodiments, in 1103, when it is determined that a collision is expected (1103-YES), the electronic apparatus 100 may proceed 1105 to transmit information on the determined collision result to the surrounding vehicle where the collision is expected. In addition to the information on the determined collision result which indicates that a collision is expected, the electronic apparatus 100 may transmit image information and sensing data information used for the corresponding determination to the corresponding surrounding vehicle. For example, the electronic apparatus 100 may transmit image information, a velocity of the other party vehicle, a distance with the other party vehicle, information on a movement direction of the other party vehicle to the corresponding surrounding vehicle.

In addition, the electronic apparatus 100 may additionally recommend an avoidance action preferably performed by each vehicle where a collision is expected. According to an embodiment, in order to avoid a collision, the electronic apparatus 100 may determine an avoidance action preferably performed by each surrounding vehicle after determining a collision possibility. The electronic apparatus 100 may recommend an avoidance action preferably performed by each vehicle where a collision is expected by transmitting the determined avoidance action with the above-described information to the surrounding vehicle.

By the above-described operations of FIGS. 10 and 11, the electronic apparatus 100 can determine a collision possibility of the vehicle itself and a collision possibility of a surrounding vehicle, and when it is determined that a collision is expected, the electronic apparatus 100 can inform the corresponding surrounding vehicle of the collision possibility. In addition, in a situation where an error occurs when determining a collision possibility due to a failure in the sensor of the vehicle itself, the electronic apparatus 100 may determine a collision possibility by using an electronic apparatus of another surrounding vehicle, and thus the collision possibility can be determined even the sensor is failed.

According to various embodiments, a method of determining a collision possibility by an electronic apparatus provided in a first vehicle (for example: electronic apparatus 100 of FIG. 3) may comprise receiving a first image captured by at least one sensor in the first vehicle, receiving at least one second image from at least one surrounding vehicle around the first vehicle via a communication unit in the first vehicle and determining a collision possibility of the first vehicle based on the first image and the at least one second image.

According to various embodiments, the method may further comprise determining a first collision possibility factor of the first vehicle based on the first image, determining a second collision possibility factor of the first vehicle based on the at least one second image and determining a collision is expected for the first vehicle when at least one of the first collision possibility factor and the second collision possibility factor indicates that a collision is expected or imminent..

According to various embodiments, the method may further comprise in response to determining that a collision is expected for the first vehicle, determining an avoidance action for the first vehicle to carry out to avoid the collision, wherein the avoidance action includes at least one of decreasing a speed of the first vehicle, stopping the first vehicle, and steering the first vehicle.

According to various embodiments, the method may further comprise in response to determining that the collision is expected for the first vehicle, estimating an estimated avoidance action of the at least one surrounding vehicle or another vehicle where the collision therewith is expected and determine the avoidance action for the first vehicle to avoid the collision based on the estimated avoidance action of the at least one surrounding vehicle or another vehicle.

According to various embodiments, the method may further comprise determining a collision possibility of the at least one surrounding vehicle or another vehicle based on the first image or the at least one second image and in response to determining that a collision is expected for the at least one surrounding vehicle or the another vehicle, transmitting a signal from the communication unit of the first vehicle to the at least one surrounding vehicle or the another vehicle, the signal indicating the collision is expected for the at least one surrounding vehicle or another vehicle.

According to various embodiments, the method may further comprise in response to determining that the collision is expected for the at least one surrounding vehicle or the another vehicle, determining a suggested avoidance action for the at least one surrounding vehicle or the another vehicle to avoid the collision and transmitting the suggested avoidance action to the at least one surrounding vehicle or the another vehicle through the communication unit.

According to various embodiments, the method may further comprise determining at least one of the collision possibility of the first vehicle and the collision possibility of the at least one surrounding vehicle or another vehicle based on an artificial neural network model for which learning is performed in advance.

According to various embodiments, the method may further comprise determining a distance between the first vehicle and the at least one surrounding vehicle or the another vehicle, a first velocity of the first vehicle, a second velocity of the at least one surrounding vehicle or the another vehicle, a first vehicle type of the first vehicle and a second vehicle type of the at least one surrounding vehicle or the another vehicle based on at least one of the first image and the at least one second image and in response to inputting the distance, the first velocity, the second velocity, the first vehicle type and the second vehicle type into the artificial neural network model, determining at least one of the collision possibility of the first vehicle and the collision possibility of the at least one surrounding vehicle or the another vehicle based on an output of the artificial neural network model.

According to various embodiments, the communication unit may be configured to communicate based on at least one of dedicated short range communication, LTE, and 5G communication.

In the present disclosure, a method capable of determining a collision possibility by using an electronic apparatus of vehicle itself and a surrounding vehicle is provided, and thus overall accidents due to collision can be prevented.

What is claimed is:

1. An electronic apparatus provided in a first vehicle for determining a collision possibility of the first vehicle, the electronic apparatus comprising:
   at least one camera configured to receive surrounding image information of the first vehicle;
   at least one sensor configured to obtain sensing data;
   a transceiver configured to communicate with at least one surrounding vehicle around the first vehicle; and
   at least one processor configured to operate in conjunction with the at least one camera, the at least one sensor and the transceiver,
   wherein the at least one processor is further configured to:
   obtain at least one of first image information through the at least one camera and first sensing data through the at least one sensor,
   determine a first collision possibility based on the at least one of the first image information and the first sensing data,
   determine whether a second collision possibility is received from the at least one surrounding vehicle via the transceiver, the second collision possibility being determined by the at least one surrounding vehicle,
   in response to receiving the second collision possibility, determine a third collision possibility based on at least one second image information received from the at least one surrounding vehicle via the transceiver, and
   determine the collision possibility of the first vehicle based on determining of the first collision possibility and determining of the third collision possibility.
   receive a first image via the at least one camera,
   receive at least one second image from the at least one surrounding vehicle via the transceiver, and
   determine a collision possibility of the first vehicle based on the first image and the at least one second image.

2. The electronic apparatus of claim 1, wherein the at least one processor is further configured to:
   in response to determining that there is the collision possibility of the first vehicle, determine a first avoidance action for the first vehicle to carry out to avoid the collision,
   wherein the first avoidance action includes at least one of decreasing a speed of the first vehicle, stopping the first vehicle, and steering the first vehicle.

3. The electronic apparatus of claim 2, wherein the at least one processor is further configured to:
   in response to determining that there is the collision possibility of the first vehicle, estimate a second avoidance action of a second vehicle having collision possibility with the first vehicle and determine the first avoidance action for the first vehicle to avoid collision with the second vehicle based on the estimated second avoidance action of the second vehicle.

4. The electronic apparatus of claim 1, wherein the at least one processor is further configured to:
   determine a fourth collision possibility of a third vehicle which is one of the at least one surrounding vehicle, and
   in response to determining that there is the fourth collision possibility, transmit a signal to the third vehicle, the signal indicating that there is collision possibility of the third vehicle.

5. The electronic apparatus of claim 4, wherein the at least one processor is further configured to:
   in response to determining that there is the fourth collision possibility, determine a suggested avoidance action for the third vehicle to avoid the collision and transmit the suggested avoidance action to the third vehicle through the transceiver.

6. The electronic apparatus of claim 4, wherein the at least one processor is further configured to:
   determine the fourth collision possibility of the third vehicle based on a relation between the third vehicle and another vehicle among the at least one surrounding vehicle included in the first image information.

7. The electronic apparatus of claim 4, wherein the at least one processor is further configured to:
   determine the first collision possibility, the third collision possibility or the fourth collision possibility based on an artificial neural network model, wherein learning is performed in advance for the artificial neural network model.

8. The electronic apparatus of claim 1, wherein the at least one processor is further configured to:
   determine a distance between the first vehicle and the at least one surrounding vehicle, a first velocity of the first vehicle, a second velocity of the at least one surrounding vehicle, a first vehicle type of the first vehicle and a second vehicle type of the at least one surrounding vehicle based on the first image information or the at least one second image information,
   input the distance, the first velocity, the second velocity, the first vehicle type and the second vehicle type into an artificial neural network model, and
   determine the first collision possibility, the third collision possibility or the fourth collision possibility based on an output of the artificial neural network model.

9. The electronic apparatus of claim 1, wherein the transceiver is further configured to communicate based on at least one of a dedicated short range communication, LTE, and 5G communication.

10. The electronic apparatus of claim 4, wherein the at least one processor is further configured to:
    receive a request for determining a collision possibility and at least one of third image information and third sensing data obtained in the third vehicle from the third vehicle, and
    determine the fourth collision possibility of the third vehicle based on the at least one of the third image information and the third sensing data.

11. A method of determining a collision possibility of a first vehicle by an electronic apparatus provided in the first vehicle, the method comprising:
    obtaining at least one of first surrounding image information of the first vehicle and first sensing data of the first vehicle;

determining a first collision possibility based on the at least one of the first surrounding image information and the first sensing data;

determining whether a second collision possibility is received from at least one surrounding vehicle, the second collision possibility being determined by the at least one surrounding vehicle;

in response to receiving the second collision possibility, determining a third collision possibility based on at least one second image information received from the at least one surrounding vehicle; and determining the collision possibility of the first vehicle based on the determining of the first collision possibility and the determining of the third collision possibility.

12. The method of claim 11, further comprising:

in response to determining that there is the collision possibility of the first vehicle, determining a first avoidance action for the first vehicle to carry out to avoid the collision, wherein the first avoidance action includes at least one of decreasing a speed of the first vehicle, stopping the first vehicle, and steering the first vehicle.

13. The method of claim 12, further comprising:

in response to determining that there is the collision possibility of the first vehicle, estimating a second avoidance action of a second vehicle having collision possibility with the first vehicle and determining the first avoidance action for the first vehicle to avoid the collision with the second vehicle based on the estimated second avoidance action of the second vehicle.

14. The method of claim 11, further comprising:

determining a fourth collision possibility of a third vehicle which is one of the at least one surrounding vehicle; and in response to determining that there is the fourth collision probability, transmitting a signal to the third vehicle, the signal indicating that there is collision possibility of the third vehicle.

15. The method of claim 14, further comprising:

in response to determining that there is the fourth collision possibility, determining a suggested avoidance action for the third vehicle to avoid the collision and transmitting the suggested avoidance action to the third vehicle.

16. The method of claim 14, further comprising:

determining the first collision possibility, the third collision possibility or the fourth collision possibility based on an artificial neural network model, wherein learning is performed in advance for the artificial neural network model.

17. The method of claim 16, further comprising:

determining a distance between the first vehicle and the at least one surrounding vehicle, a first velocity of the first vehicle, a second velocity of the at least one surrounding vehicle, a first vehicle type of the first vehicle and a second vehicle type of the at least one surrounding vehicle based on at least one of the first image information or the at least one second image information;

inputting the distance, the first velocity, the second velocity, the first vehicle type and the second vehicle type into the artificial neural network model; and determining the first collision possibility, the third collision possibility or the fourth collision possibility based on an output of the artificial neural network model.

18. The method of claim 11, further comprising:

receiving a request for determining a collision possibility and at least one of third image information and third sensing data obtained in the third vehicle from the third vehicle; and determining a fourth collision possibility of the third vehicle based on the at least one of the third image information and the third sensing data.

19. The method of claim 11, further comprising:

determining the fourth collision possibility of the third vehicle based on a relation between the third vehicle and another vehicle among the at least one surrounding vehicle included in the first image information.

\* \* \* \* \*